United States Patent [19]

Ackeret

[11] Patent Number: 4,776,119
[45] Date of Patent: Oct. 11, 1988

[54] CONTAINER FOR A PILE OF SHEETS

[75] Inventor: Peter Ackeret, Kusnacht, Switzerland

[73] Assignee: Licinvest AG, Chur, Switzerland

[21] Appl. No.: 900,149

[22] PCT Filed: Nov. 12, 1985

[86] PCT No.: PCT/EP85/00609
§ 371 Date: Jul. 11, 1986
§ 102(e) Date: Jul. 11, 1986

[87] PCT Pub. No.: WO86/03023
PCT Pub. Date: May 22, 1986

[30] Foreign Application Priority Data
Nov. 13, 1984 [DE] Fed. Rep. of Germany ....... 3441464

[51] Int. Cl.$^4$ ............................................. G09F 11/30
[52] U.S. Cl. ......................................... 40/513; 40/490; 40/511
[58] Field of Search ................. 40/513, 511, 490, 488, 40/489, 10 R

[56] References Cited

U.S. PATENT DOCUMENTS

| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |
| 4,238,899 | 12/1980 | Ackeret | 40/513 |
| 4,241,528 | 12/1980 | Ackeret | 40/513 |
| 4,242,820 | 1/1981 | Ackeret | 40/513 |
| 4,245,417 | 1/1981 | Ackeret | 40/511 |
| 4,259,802 | 4/1981 | Ackeret | 40/513 |
| 4,550,516 | 11/1985 | Ackeret | 40/513 |

FOREIGN PATENT DOCUMENTS 2403574 4/1979 France.
2833410 2/1980 Fed. Rep. of Germany.
3342238 6/1984 Fed. Rep. of Germany.

Primary Examiner—Gene Mancene
Assistant Examiner—J. R. Hakomaki
Attorney, Agent, or Firm—Robert R. Jackson

[57] ABSTRACT

The invention relates to a container for a pile of sheets essentially of like format with a housing (12), which has a viewing window (35) exposing to view the uppermost sheet in the pile, and with a slider member (14), which can be pulled out of the housing parallel to the plane of the window, having a front wall (61) essentially flush with one edge of the housing, which wall is joined by side-pieces (44) to a slider member rear wall (20), as well as a grip arrangement (56, 57) that fits-in in the direction of the window (35) from the front wall (61) and comprises a grip top plate or wall part (56) and a grip bottom plate or wall part (57), the outer faces of which are essentially flush with the surrounding outer faces of the housing, and having at least one housing part (627) that extends parallel to the or one of the grip plates and, when the slider member (14) is in the pushed-in state, is covered by this grip plate (57).

8 Claims, 3 Drawing Sheets

CONTAINER FOR A PILE OF SHEETS

The invention relates to a container for a pile of sheets essentially of like format. A container of this type, designed as a sheet changer, is disclosed in U.S. Pat. No. 4,376,348. The known container comprises a housing with a viewing window from which a slider member carrying the pile of sheets can be pulled out and pushed back in again in a direction parallel to the plane of the viewing window. Each time the slider member is moved back and forth a sheet is removed from one end of the pile and put back at the other end of the pile, so that by the relative movements of the housing and slider member the pile is cyclically rearranged. For aesthetic reasons and also in order to be able to use the container as a stand-up or hanging frame, the outline of the container is, apart from rounded-off parts, intended to be essentially of a closed-rectangular shape. On the other hand, the user must be able to grasp the slider member. Therefore, the known container has moulded onto the slider member a grip part which fits-in inwards towards the viewing window from a slider member front end which is flush with one edge of the housing. The grip part has at the top and at the bottom a grip plate or wall, the outer faces of which are flush with the surrounding housing faces, and these housing faces have cut-outs or recesses complementary with the grip plates. From the front wall of the slider member side-pieces extend into the container which are joined to each other by an inner transverse wall, designed in the case mentioned as a separator bar. The pile of sheets, of which the front edge bears against the grip part and is supported by the bottom grip plate, rests on these side pieces. When the slider member is in the fully withdrawn position, the transverse edge of the pile facing the housing is supported only laterally by the side-pieces of the slider member.

With sheets that are particularly bowed, especially with photographic prints, when the slider member is pushed in the centre of the lower sheets in the pile may therefore strike the extreme edge of the grip plate recess, as a result of which the sheets are damaged, and this applies similarly to the upper end of the pile in the case of bowing in the opposite direction. At the upper end of the pile there is, of course, less risk, because the top grip plate is much narrower than the bottom one and consequently also the sheets are checked over a greater width by the surrounding housing top faces. This problem could be solved by simply extending the housing and slider member in the withdrawal direction, but this results in a large unwieldy container and also in the use of more material, which is undesirable in mass-produced articles of this type made of injection-moulded plastics.

In accordance with the invention, therefore, another solution to this problem is provided by a container for a pile of sheets, essentially of like format, with a housing which has a viewing window exposing to view the uppermost sheet in the pile, and with a slider member, which can be pulled out of the housing parallel to the plane of the window, having a front wall essentially flush with one edge of the housing, which wall is joined by side-pieces to a slider member rear wall, as well as a grip arrangement that fits-in in the direction of the window from the front wall and comprises a grip top plate or wall and a grip bottom plate or wall, the outer faces of which are essentially flush with the surrounding outer faces of the housing, and having at least one housing part that extends parallel to one of the grip plates and, when the slider member is in the pushed-in state, is covered by this grip plate.

The invention is described in detail in the following with reference to the accompanying drawings.

Figure 1:
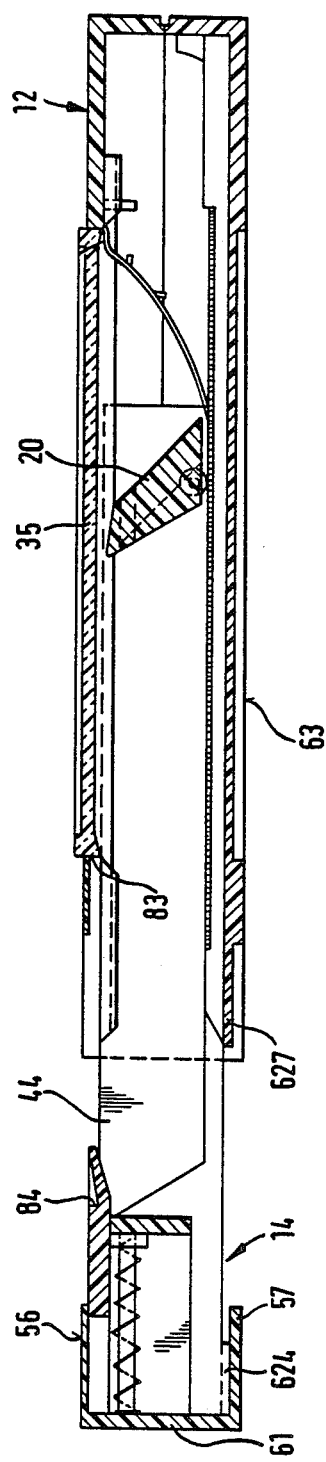
FIG. 1 is a longitudinal section of a first embodiment

In the drawings, details are also shown that are not developed within the scope of the present invention and are therefore not explained; insofar as the complete design and operation of the sheet changer are of interest (the examples of execution are sheet changers), reference can be made to the prior art mentioned at the beginning.

Figure 2:
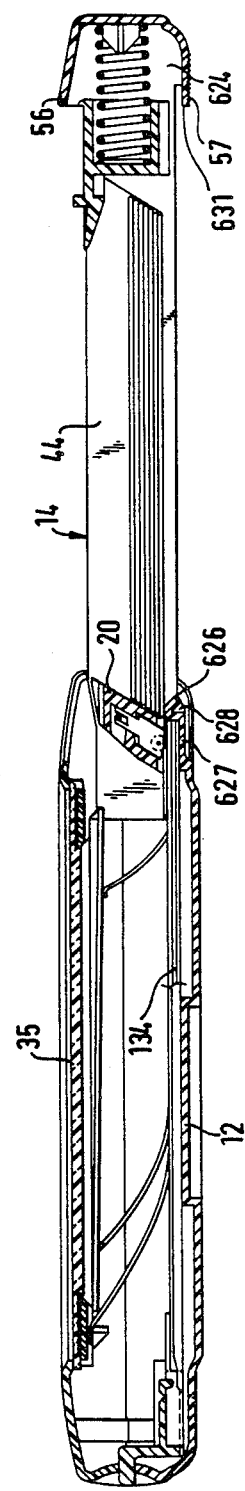
FIG. 2 is an analogous representation of a second embodiment
Figure 3:
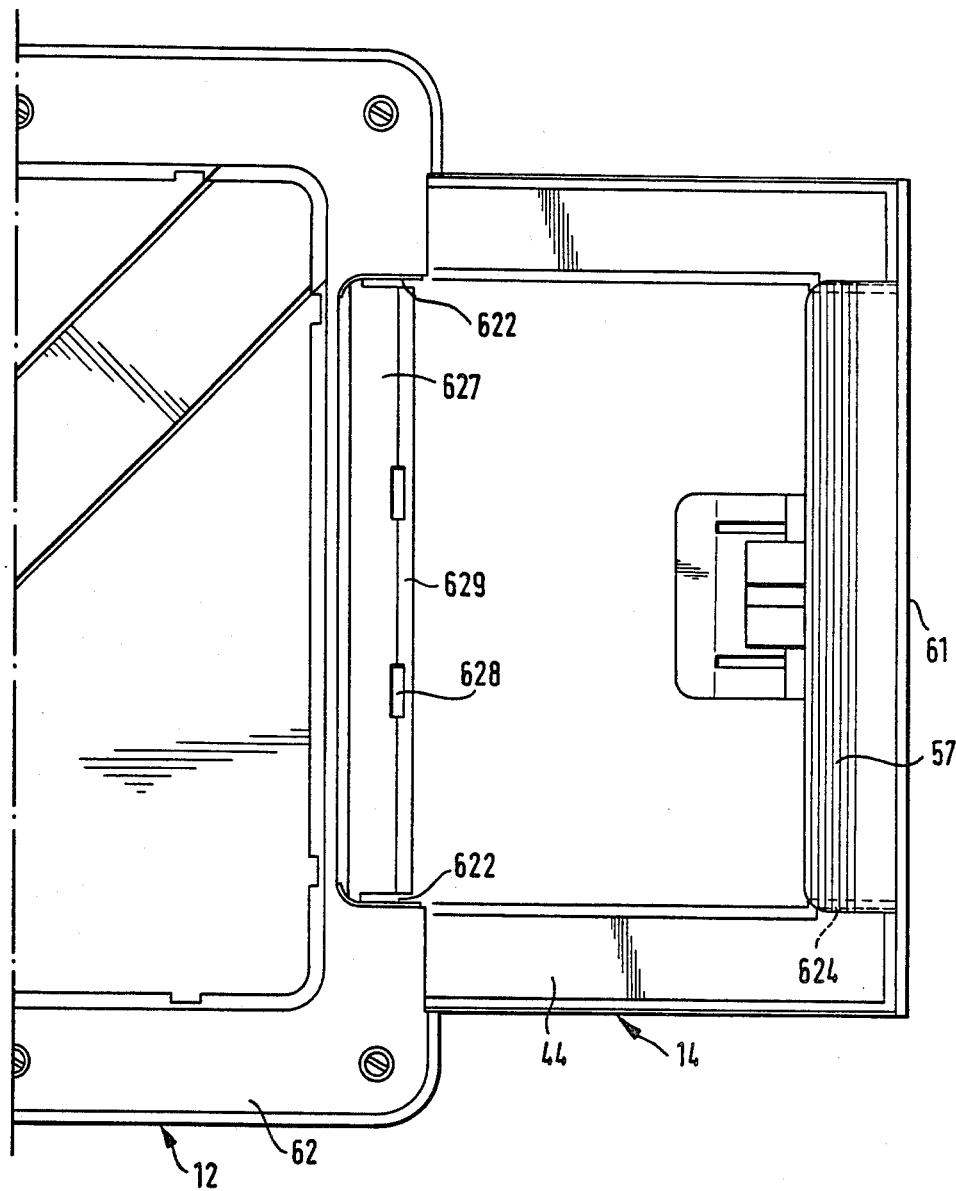
FIG. 3 is a view from below of the second embodiment with the slider member only partially withdrawn.

FIG. 1 shows the housing 12 with viewing window 35 from which the slider member 14 has been partially withdrawn. The slider member consists of a front wall 61, side-pieces 44 joined to this, an inner transverse wall in the form of a separator bar 20, and also a grip arrangement comprising the top grip plate or wall part 56 and a bottom grip plate or wall part 57, which arrangement is joined by a connecting ribs or webs 624 to the side-pieces. When the slider member is pushed in the bottom grip plate positions itself below an extension plate 627 running parallel to it, of the base 63 of the housing, the outer faces of the grip plates being essentially flush with the surrounding outer faces of the housing.

Where the same reference numerals are used in FIGS. 2 and 3 as in FIG. 1, they denote corresponding components in this embodiment. In addition, it can also be seen in FIG. 2 that the opposing transverse edges of the housing part 627 on the one hand, and the bottom grip plate 57 on the other, each have sloped parts 631 complementary with one another, so that these edges are prevented from striking each other hard when the slider member is pushed in if, for example, the parts were to be even only slightly deformed as a result of temperature variations. On the side remote from the grip plate 57 the housing part carries guide elements 626 of which the lower hollow chamber 628 can be seen also in FIG. 3, these guide elements being provided in the direction of insertion of the slider member in front of projecting rails arranged in the housing 12, so that they guide the pile of sheets onto these rails and prevent the lower sheets in the pile striking the front end of the rails 134.

Although the development according to the invention has been explained in the examples of execution only for the bottom grip plate 57, similar considerations apply also to the upper grip plate. For example, in FIG. 1 it can be seen that there is still a portion of the housing top wall lying above a slidable catch, movably mounted under the grip plate 56, after insertion into the housing 12 and meeting the edge 83, the function of which portion of top wall is comparable with the housing portion 627, since this feature, too, is provided for the purpose of making the container shorter.

I claim:

1. A container for a pile of substantially rectangular sheets having substantially identical format, said container comprising:

a housing having a substantially planar top wall, a substantially planar bottom wall substantially parallel to and spaced from said top wall, rim portions joining portions of the outer peripheries of said top and bottom walls and cooperating with said top and bottom walls to define an opening in said housing, and a substantially planar viewing window through a substantially central portion of said top wall for display of an uppermost sheet of said pile, a portion of at least one of said top and bottom walls adjacent to said opening being recessed in the direction of the other one of said top and bottom walls to define a depression, and a pile supporting slider received in said housing and reciprocable relative thereto through said opening in a direction parallel to the plane defined by said window, said slider having a front wall which is substantially flush with said rim portions when the slider is in the housing, said slider further having a rear wall and side-pieces joining said front wall to said rear wall, said slider further having a grip portion exteding from said front wall in the direction of said rear wall, said grip portion including at least one grip plate extending into said depression in overlapping relation with said recessed portion so that said grip plate is outside of said housing when said slider is received in said housing, said grip plate having an outer face substantially flush with the surface of said one of said first and second walls surrounding said recessed portion when said slider is received in said housing.

2. The container of claim 1 wherein said at least one grip plate is connected to said side-pieces by connecting ribs which, when the slider is received in the housing, extend into complementary slots extending into a housing wall from said opening.

3. The container of claim 1 wherein said at least one grip plate has an end edge facing said recessed portion and presenting a wedge-shaped section, and said recessed portion has an end edge facing said grip portion and presents a wedge-shaped section, said grip plate end edge and said recessed portion end edge being complementarily sloped so as to prevent said end edges from obstructing one another upon the slider being pushed into the housing.

4. The container of claim 1 including stop means for defining a withdrawn position of said slider relative to said housing, and said recessed portion overlapping a sheet pile supported by said slider in said withdrawn position.

5. The container of claim 1 wherein said housing includes elements located adjacent said opening for guiding a pile supported by a withdrawn slider upon said slider being pushed into the housing.

6. The container of claim 1 including means for transferring an individual sheet from one end of a pile in the container to an opposite end of the pile upon each reciprocation of the slider relative to the housing.

7. A container for a pile of substantially rectangular sheets having substantially identical format, said container comprising:

a housing having a top wall, a bottom wall spaced from said top wall, rim portions joining portions of the outer peripheries of said top and bottom walls and cooperating with said top and bottom walls to define an opening in said housing, and a substantially planar viewing window through a substantially central portion of said top wall for display of an uppermost sheet of said pile, and a pile supporting slider received in said housing and reciprocable relative thereto through said opening in a direction parallel to the plane defined by said window, said slider having a front wall which is substantially coextensive with said opening when the slider is in the housing, said slider further having a rear wall and side-pieces joining said front wall to said rear wall, said slider further having a grip portion extending from said front wall in the direction of said rear wall, said grip portion including at least one grip plate extending in overlapping relation with one of said top and bottom walls so that said grip plate is outside of said housing when said slider is received in said housing.

8. The container of claim 7 wherein said grip plate has an outer face substantially flush with an adjacent surface of said one of said top and bottom walls.

* * * * *